(12) United States Patent
Plocher et al.

(10) Patent No.: US 9,346,408 B2
(45) Date of Patent: May 24, 2016

(54) DEVICE FOR ARRANGING A REFLECTIVE-VEST DEVICE ON A SIDE DOOR OF A MOTOR VEHICLE

(71) Applicant: Daimler AG, Stuttgart (DE)

(72) Inventors: Bernd Plocher, Rottenburg (DE); Leif Eckle, Wiernsheim (DE); Almar Teubert, Bondorf (DE); Klaus Holder, Weinstadt (DE); Andreas Friedrich, Neuhausen (DE); Klaus Kuonath, Calw (DE); Patrick Boehmler, Boeblingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/420,432

(22) PCT Filed: Aug. 3, 2013

(86) PCT No.: PCT/EP2013/002330
§ 371 (c)(1),
(2) Date: Feb. 9, 2015

(87) PCT Pub. No.: WO2014/023412
PCT Pub. Date: Feb. 13, 2014

(65) Prior Publication Data
US 2015/0203048 A1 Jul. 23, 2015

(30) Foreign Application Priority Data
Aug. 10, 2012 (DE) .......................... 10 2012 016 010

(51) Int. Cl.
*B60R 7/04* (2006.01)
*B60J 5/04* (2006.01)
*B60R 13/02* (2006.01)

(52) U.S. Cl.
CPC .............. *B60R 7/046* (2013.01); *B60J 5/0413* (2013.01); *B60R 13/0243* (2013.01); *B60R 2013/0287* (2013.01)

(58) Field of Classification Search
CPC ..... F25C 5/005; F25D 23/028; Y10T 16/458; B60Q 1/24; B60Q 1/323; A41D 13/01; A41D 31/0088; G08B 5/004; D07B 2205/2014; D07B 2801/10
USPC ................... 296/37.13, 146.7; 16/412; 49/502
See application file for complete search history.

(56) References Cited

U.S. PATENT DOCUMENTS 1,694,060 A 12/1928 Duncan
3,239,988 A * 3/1966 Meyer ..................... F16B 5/128
24/297

(Continued)

FOREIGN PATENT DOCUMENTS

DE 100 52 230 A1 5/2002
DE 10 2006 036 030 A1 2/2008

(Continued)

OTHER PUBLICATIONS

International Search Report (PCT/ISA/220 and PCT/ISA/210) dated Sep. 26, 2013 with English translation (eight pages).

(Continued)

*Primary Examiner* — Kiran B Patel
(74) *Attorney, Agent, or Firm* — Crowell & Moring LLP (57) ABSTRACT

A device to arrange a high-visibility vest device, enclosing a high visibility vest at least in sections, to the side door of a motor vehicle includes fixing elements provided on the door and the vest device that interact with each other so that the vest device is moveable into and out of operative engagement with the door side fixing element.

19 Claims, 5 Drawing Sheets

(56) References Cited

U.S. PATENT DOCUMENTS

| | | | | | |
|---|---|---|---|---|---|
| 4,445,720 | A * | 5/1984 | Leaf | ............................ | B60R 7/12 135/16 |
| 5,749,600 | A * | 5/1998 | Yamada | ................. | B60J 5/0425 280/751 |
| 6,116,672 | A * | 9/2000 | Cannon | .................... | B60R 7/046 224/547 |
| 6,182,291 | B1 * | 2/2001 | Garvey | .............. | A41D 13/0012 2/102 |
| 6,185,872 | B1 * | 2/2001 | Seeberger | ............ | B60R 16/0207 49/502 |
| 6,196,605 | B1 * | 3/2001 | Baldas | ..................... | B60R 7/046 224/543 |
| 7,032,945 | B1 | 4/2006 | Tiesler | | |
| 7,150,550 | B2 * | 12/2006 | Bogdan | ............. | B29C 45/14778 362/154 |
| 7,192,074 | B2 * | 3/2007 | DePue | .................... | B60R 7/046 296/146.7 |
| 7,237,933 | B2 * | 7/2007 | Radu | ................. | B29C 45/14778 296/146.7 |
| 7,244,383 | B2 * | 7/2007 | Youngs | ................... | B60R 11/00 264/255 |
| 7,265,306 | B2 * | 9/2007 | Radu | ................... | B60R 13/0243 200/310 |
| 7,287,885 | B2 * | 10/2007 | Radu | ................... | B29C 45/0017 362/154 |
| 7,299,892 | B2 * | 11/2007 | Radu | ................... | B60R 13/0237 181/141 |
| 8,109,558 | B2 * | 2/2012 | Nakamori | .............. | B60J 5/0443 296/146.6 |
| 2002/0145805 | A1 * | 10/2002 | Hall | ........................ | G08B 5/004 359/516 |
| 2002/0185888 | A1 * | 12/2002 | Jonardi | .................... | B60R 7/046 296/152 |
| 2003/0052502 | A1 * | 3/2003 | Schmidt | ................. | B60K 37/06 296/37.13 |
| 2003/0097796 | A1 * | 5/2003 | Schutt | ................ | B29C 45/14467 49/502 |
| 2005/0206193 | A1 * | 9/2005 | Sweers | ................ | B60R 21/0428 296/146.7 |
| 2005/0218694 | A1 * | 10/2005 | Schoemann | ........... | B60J 5/0416 296/146.7 |
| 2008/0067202 | A1 * | 3/2008 | Silva | ...................... | A41D 13/01 224/148.2 |
| 2013/0057024 | A1 | 3/2013 | Wolff et al. | | |
| 2014/0028044 | A1 * | 1/2014 | Hamamoto | ............. | B60R 7/046 296/37.13 |
| 2014/0138978 | A1 * | 5/2014 | Langenbacher | ....... | B60N 2/466 296/37.13 |
| 2015/0268010 | A1 * | 9/2015 | Strauss | .................... | F41H 7/044 89/36.02 |

FOREIGN PATENT DOCUMENTS

| | | |
|---|---|---|
| DE | 10 2009 039 380 A1 | 3/2011 |
| EP | 1 733 923 A1 | 12/2006 |
| FR | 2 931 745 A1 | 12/2009 |
| FR | 2 943 292 A1 | 9/2010 |
| FR | 2 949 727 A1 | 3/2011 |
| JP | 62-203754 U | 12/1987 |
| JP | 2000-219073 A | 8/2000 |
| JP | 2005-306341 A | 11/2005 |
| WO | WO 2005/099402 A2 | 10/2005 |
| WO | WO 2006/113870 A1 | 10/2006 |
| WO | WO 2007/093705 A2 | 8/2007 |
| WO | WO 2011/107212 A1 | 9/2011 |

OTHER PUBLICATIONS

German-language Written Opinion (PCT/ISA/237) dated Sep. 26, 2013 (seven pages).
German Office Action dated Mar. 15, 2013 (five pages).

* cited by examiner

DEVICE FOR ARRANGING A REFLECTIVE-VEST DEVICE ON A SIDE DOOR OF A MOTOR VEHICLE

BACKGROUND AND SUMMARY OF THE INVENTION

Exemplary embodiments of the invention relate to a device to arrange a high-visibility vest device on a side door of a motor vehicle.

If, while driving with a motor vehicle, a breakdown or an accident occurs, as a consequence of which at least one person must leave the motor vehicle, wearing a high-visibility vest thus ensures very high safety for the person moving outside the motor vehicle close to the road. High-visibility vests are, for example, designed to be luminescent in color according to European standard EN 471, such that the person wearing the high-visibility vest can be seen particularly well by other road users. Thus, secondary accidents can be prevented.

Wearing such a high-visibility vest is increasingly becoming compulsory due to legal requirements for persons leaving the motor vehicle and remaining in the road. Thus, the high-visibility vests should already be put on when leaving the motor vehicle. In order that the person leaving the motor vehicle can comfortably comply with this obligation, a corresponding accommodation of the high-visibility vest and, in particular, a corresponding handling of this, must be created.

French patent document FR 2 931 745 A1 discloses an arrangement of a high-visibility vest device on a vehicle seat of a motor vehicle, in which the high-visibility vest device comprises a container as well as a high-visibility vest received in the container. The container is therein partially arranged in a storage space of a seat part of the vehicle seat. The high-visibility vest can be removed from this by opening the container.

European patent document EP 1 733 923 A1 discloses a storage container having a high-visibility vest. The storage container has a cylindrical tube that is closed on one side with a base, and a cover that is connected to the tube, that seals the opening of the tube and is removable. The high-visibility vest is situated at least partially inside the tube, in a rolled-up state. The storage container can be stored in a corresponding storage space of a central console.

Additionally, German patent document DE 10 2006 036 030 A1 discloses a high-visibility vest applied to a webbing of a safety belt.

German patent document DE 10 2009 039 380 A1 discloses a device to arrange a high-visibility device, comprising at least one high-visibility vest, to a side door of a motor vehicle. The high-visibility device comprises at least one receiving element that at least partially encloses the high-visibility vest, the receiving element being formed as a storage container enclosing the high-visibility vest on all edges. The device comprises a side storage space of an inner paneling of the side door. Therein the high-visibility vest can be accommodated in the side storage space and can thus be arranged on the side door.

The handling of the known device for the arrangement of the high-visibility vest device on the side door is therein in need of improvement such that a vehicle passenger of the motor vehicle can put on and store the high-visibility vest simply and comfortably.

Exemplary embodiments of the present invention are directed to a device for the arrangement of a high-visibility vest device on a side door of a motor vehicle of the type referred to at the beginning such that the high-visibility vest device can be handled particularly simply.

In order to create a device to arrange a high-visibility vest device on a side door of a motor vehicle, which has particularly simple handling, in a first aspect of the invention at least one first fixing means of the device is provided on the side door, onto which the high-visibility vest device can be fixed by the interaction of the first fixing means with at least one second fixing means that is on a receiving element serving for the reception of at least one high-visibility vest. The receiving element can therein completely or partially comprise or enclose the at least one high-visibility vest. The fixing means ensure a defined connection of the high-visibility vest device to the side door, which can be produced and released in a simple and ergonomic manner for a vehicle passenger of the motor vehicle. In particular, a standardized fixing or fixability of the high-visibility device to the side door can be created, which benefits the handling.

In an advantageous embodiment of the invention, the high-visibility device is able to be fixed or is fixed positively to the side door by the fixing means that interact with one another. A rattle-free and firm connection is hereby created. The fixing of the high-visibility vest device to the side door also provides safety in the event of an accident, as the risk that the high-visibility vest device releases from the side door is particularly low.

Due to the fixing means and in particular due to the positive connection, a haptic feedback to a person fixing the high-visibility vest device to the side door can be implemented, such that it is thus communicated to the person that the high-visibility vest device is fixed firmly and securely to the side door.

Here, for example, a latch connection is created by the interaction of the fixing means. If the second fixing means on the receiving element-side moves into a predetermined position relative to the door-side first fixing means, then the fixing means engage with one another, whereby an aural and, in particular, haptic (perceptible) feedback of the fixed connection of the high-visibility vest device to the side door is fed back to the person.

The fixing means thereby enable both an ergonomic and simple release of the high-visibility vest device from the side door and a simple and ergonomic fixing of this to the side door. The releasing and fixing can occur with the hand that is furthest away from the side door of the vehicle passenger sitting next to the side door. The vehicle passenger is thus able to be prevented from having to move awkwardly and unergonomically in the vehicle seat in order to reach the high-visibility vest device. In contrast to this, he can reach the high-visibility vest device in a simple manner by reaching around with the hand which is further away from the side door.

To implement a defined arrangement and alignment of the high-visibility vest device on and relative to the side door, in a further embodiment of the invention one of the fixing means has a guide, into which the other fixing means is able to be inserted in an insertion direction.

It has furthermore been shown to be advantageous if the guide tapers in the insertion direction. In other words, the guide has a cross-section that decreases in the insertion direction. Thus, it is possible to pre-position the high-visibility vest device first in a region of the guide in which it still has a relatively large cross-section. In connection to the pre-positioning, the high-visibility vest device can be displaced along the guide in the insertion direction. Due to the cross-section that decreases in the insertion direction, the high-visibility vest device is guided in a defined manner and aligned relative to the side door such that it occupies a defined and predeterminable storage position. This storage position therein is always at least substantially the same due to the guide and the exact positioning, even in the case of repeated releasing and fixing of the high-visibility vest device.

Due to the tapering guide, thus an automatically-positioning fixing is implemented in which the person displaces the high-visibility vest device in a simple manner and ergonomically along the guide, whereby the high-visibility vest device is brought into its storage position automatically.

The high-visibility vest device can be released from the side door in just as simple a manner. For this purpose, the high-visibility vest device is extracted against the insertion direction. Due to the guide extending against the insertion direction, a jamming and tilting of the high-visibility vest device can be prevented during insertion or extraction.

For the implementation of a particularly simple handling, even in dark environmental conditions in the passenger space of the motor vehicle, at least one handle is arranged on the receiving element, by means of which the receiving element-side second fixing means is able to move relative to the door-side first fixing means, into and out of operative connection with this. The handle is able to be felt very easily from the passenger space by a vehicle passenger such that he can then locate and put on the high-visibility vest, even if he cannot exactly see the high-visibility vest device due to poor lighting conditions.

Preferably, the handle is formed ergonomically such that a particularly comfortable releasing and fixing of the high-visibility vest device is ensured. For this purpose, the handle is preferably fixed on the receiving element by two ends of the handle that are at a distance from each other. Thus, the vehicle passenger can grip the handle firmly.

In a further embodiment of the invention the high-visibility vest is held in a compacted manner by the receiving element. Thus, the high-visibility vest device has only a very low space requirement.

Preferably, the high-visibility vest is rolled up and held in a rolled-up manner by the receiving element. Thus, a fold and a risk of breaking of the high-visibility vest resulting from this can be prevented. At the same time, the high-visibility vest has only a very low space requirement.

The high-visibility vest device can be fixed to an interior door paneling part of the side door, in particular to an armrest of the interior door paneling part. Thus, a defined position is allocated to the high-visibility vest device.

In a further, particularly advantageous embodiment of the invention, a base of the storage compartment that limits a storage space of a storage compartment of the side door downwards in the vehicle vertical direction is covered by the high-visibility vest device arranged at a distance from the base, upwards in the vehicle vertical direction, in the state in which the high-visibility vest device is arranged on the side door. The high-visibility vest device is therein able to be reached very easily. At the same time, the storage space of the storage compartment is not impaired by the high-visibility vest device.

The high-visibility vest device can be fixed to hang on the interior door paneling part of the side door, in particular on the arm rest of the interior door paneling part. Thus, the storage space of the storage compartment is not impaired due to the hanging positioning.

It has been shown to be of further advantage if the high-visibility vest device is at least partially covered by a side wall of the storage compartment, inwardly in the vehicle transverse direction, in a state in which it is arranged on or fixed to the side door. The high-visibility vest device is thus at least partially not visible by the vehicle passenger, which benefits the optical impression of the side door. Additionally, the side wall can hold back the high-visibility vest device such that this cannot move around in an uncontrolled manner in the passenger space. The high-visibility vest device is therein, for example, accessible, in particular from the front, via an opening in the vehicle longitudinal direction and can be moved relative to the side door and released from this or fixed to this via the opening.

Preferably, the high-visibility vest device projects over the side wall in the vehicle longitudinal direction such that, for example, the handle extends out of the storage compartment and can be felt and/or seen very well by a vehicle passenger. The predominant part of the high visibility vest device is herein, however, covered by the side wall such that the high-visibility vest device does not impair the optical impression of the passenger space. Therein, for example, it can be provided that the handle is adapted to an interior design of the passenger space. The at least partially visible handle is thus integrated into the passenger space optically attractively with regard to the design.

In the case of a second aspect of the invention, for the implementation of particularly good handling of the high-visibility vest device at least one handle is arranged on the receiving element, by means of which the high-visibility vest device is able to move relative to at least one door-side fixing means, in and out of operative connection with the door-side fixing means, to fix the high-visibility vest device to the device. Therein, for example, the receiving element-side fixing means is able to move into and out of operative connection with this, relative to the door-side fixing means. The high-visibility vest device can be moved particularly simply and ergonomically relative to the side door, and thus can be fixed to this or released from this via the handle, which is a handle of the high-visibility vest device. Advantageous embodiments of the first aspect of the invention are to be considered as advantageous embodiments of the second aspect of the invention and reversed.

The handle also enables a vehicle passenger to be able to feel the high-visibility vest device even in poor lighting conditions and, for example, in darkness, and can put on the high-visibility vest without the vehicle passenger being able to see the high-visibility vest exactly. In order to be able to recognize the handle, even in poor lighting conditions, this is preferably provided with a light source and/or with a fluorescent marking.

Further advantages, features and details of the invention result from the description below of preferred exemplary embodiments as well as by means of the drawing. The features and feature combinations referred to above in the description as well as the features and feature combinations referred to below in the description of the figures and/or shown in the Figures alone are not only able to be applied in the respectively specified combination, but also in other combinations or alone, without leaving the scope of the invention.

DETAILED DESCRIPTION

Figure 1:
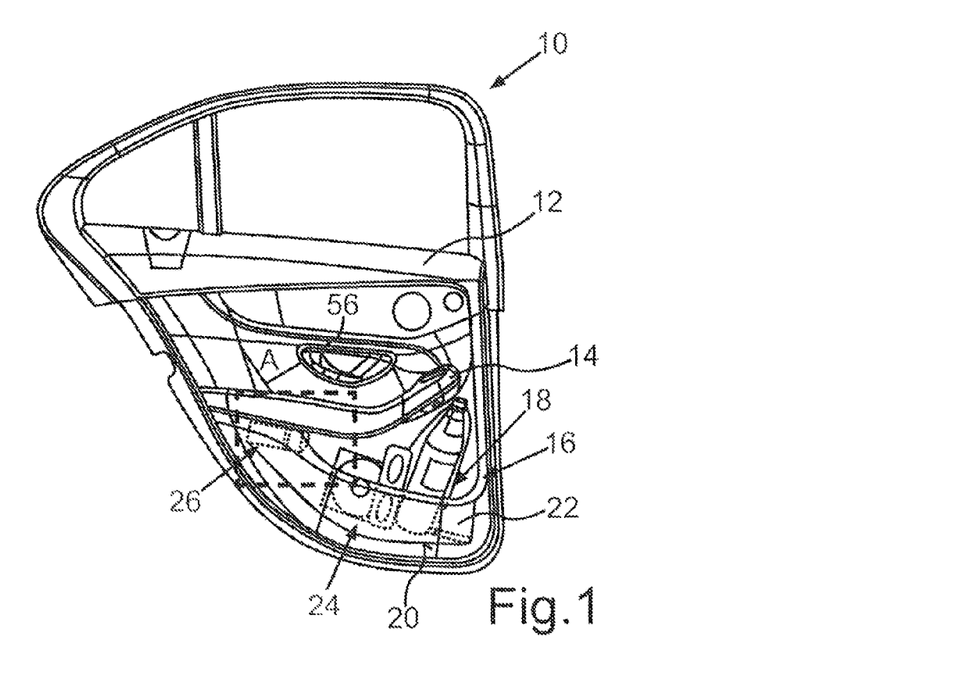
FIG. 1 a schematic side view of a rear side door of a passenger motor vehicle from inside, as well as a device to arrange a high-visibility vest device, having a high-visibility vest and having a receiving element enclosing the high-visibility vest at least in sections, on the side door, wherein the high-visibility vest device is fixed to the rear side door via a first fixing means of the device provided on the side door and via a second fixing means of the device provided on the receiving element.

FIG. 1 shows a rear side door 10 for a passenger motor vehicle. The side door 10 comprises an interior door paneling part 12, by means of which a door shell of the side door 10 is covered at least partially inwards in the vehicle transverse direction. The interior door paneling part 12 has an arm rest 14, on which a vehicle passenger sitting on the side of the side door 10 can support his arm.

In the vehicle vertical direction underneath the arm rest 14, a storage compartment 16 of the side door 10 is provided, which has a storage space 18. The storage space 18 is therein limited downwards in the vehicle vertical direction by a base 20 and inwards in a vehicle transverse direction by a side wall 22 of the storage compartment 16. Transport goods 24 can be stored in the storage space 18. The side wall 22 therein extends in the vehicle longitudinal direction from the front, downwards to the back, over the arm rest 14.

Figure 7:
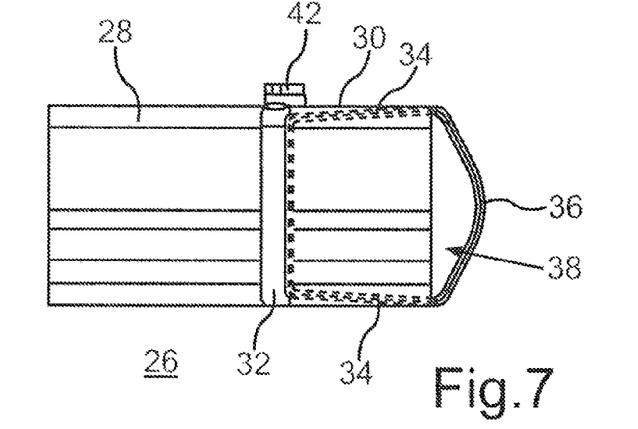
FIG. 7 a schematic side view of the high-visibility vest device.
Figure 8:
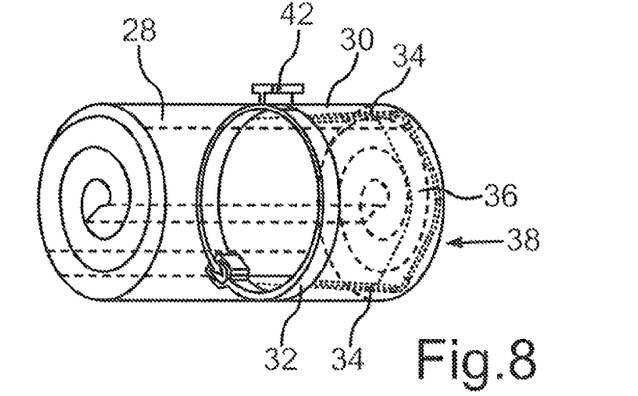
FIG. 8 a schematic perspective view of the high-visibility vest device.
Figure 9:
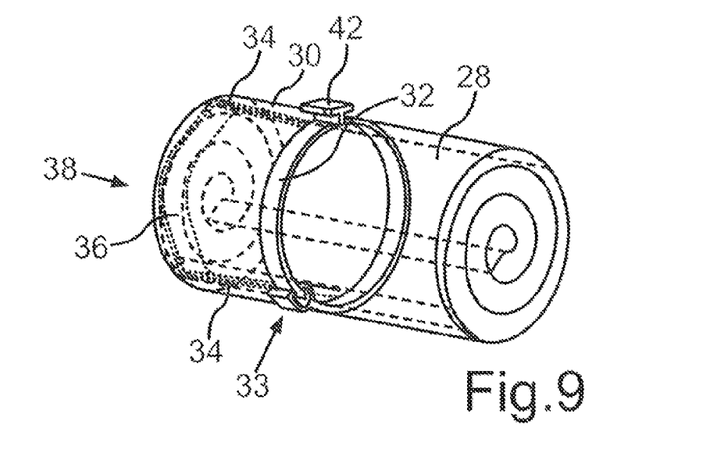
FIG. 9 a further schematic perspective view of the high-visibility device.

A high-visibility vest device 26 that can be particularly well recognized in FIGS. 7 to 9, is arranged in a rear upper region of the side wall 22 in the vehicle longitudinal direction, which is fixed to the side door 10.

The high-visibility vest device 26 therein comprises a high-visibility vest 28 as well as a receiving element 30, which is presently formed as a clip and is produced from a metallic material. The receiver element 30 encloses the high-visibility vest 28 at least partially, whereby the high-visibility vest 28 is held in a rolled-up state that is thus very strongly compacted. Due to the rolling-up of the high-visibility vest 28, the high-visibility vest 28 has at least substantially the form of a straight circular cylinder having an outer diameter, on the outer peripheral side. The receiving element 30 has an at least substantially annular receiving part 32, in which the straight circular cylinder is received in sections.

In other words, the receiving part 32 completely encloses the straight circular cylinder in a partial region of its longitudinal extension on the outer peripheral side in the peripheral direction. Two further receiving parts 34 of the receiving element 30 that are at a distance from each other in the peripheral direction extend away from the receiving part 32 in the axial direction of the straight circular cylinder or the receiving part 32, the receiving parts 34 being connected to one another via a handle in the form of a handle 36 of the receiving element 30. The handle 36 therein covers a front side 38 of the straight circular cylinder that is facing towards the handle 36 in the axial direction and is at a distance from the front side 38 such that the handle 36 can be gripped very well and ergonomically by a vehicle passenger with the hand thereof. The handle 36 is therein connected to the respective receiving parts 34 in respective end regions. For this purpose, the handle 36 can be formed as one piece with the receiving parts 34. Therein the entire receiving element 30 can be formed in one piece.

Due to the rolling-up of the high-visibility vest 28, damage and in particular breakage of the high-visibility vest 28 and in particular damage and breakage of reflective strips of the high-visibility vest 28 can be prevented.

If the vehicle passenger wishes to put on the high-visibility vest 28, then this can be pulled out from the receiving part 32 by the handle 36 in a simple manner. In order to arrange the high-visibility vest 28 in the receiving element 30 again in a simple manner, the receiving part 32 has free ends 33 that are able to connect positively to one another and the high-visibility vest 28 is held in a rolled up and thus compacted manner in the state in which that are connected positively to one another. In order to arrange the high-visibility vest 28 again around the receiving element 30, the positive connection between the free ends 33 is removed such that the free ends 33 can be at a distance from one another due to elasticity of the receiving parts 34. Thus, an inner diameter of the receiving part 32 can be extended with respect to the state of the free ends 33 in which they are connected to one another, such that the high-visibility vest 28 can be arranged in the receiving part 32 in a simple manner. In other words, the receiving part 32 or the receiving element 30 is able to be opened and sealed again.

As will be appreciated from FIG. 1, the high-visibility vest device 26 fixed to the side door 10 is accessible from the passenger space and can be moved relative to the side door 10 via the handle 36. The handle 36 thus represents a handle for the simple handling of the high-visibility vest device 26.

For the implementation of a firm and defined support and alignment of the high-visibility vest device 26 on the side door 10, a device is provided to arrange the high-visibility device 26 on the side door 10. Therein, a door-side first fixing means 40 is arranged on the side door 10 and presently on the interior door paneling part 12. Additionally, a receiving element-side second fixing means 42 is provided on the receiving element 30, wherein the second fixing means 42 is formed in one piece with the receiving element 30.

Figure 2:
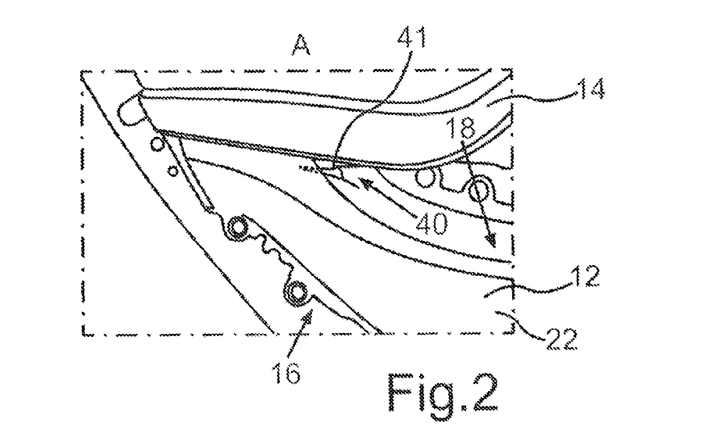
FIG. 2 in sections, a schematic perspective view of the rear side door, depicted in an enlarged manner, FIG. 3 a schematic side view of a front side door of the passenger motor vehicle from the inside, wherein a high-visibility vest device is fixed on the front side door.

In FIG. 2 a region of the side door 10 referred to with A is depicted in an enlarged manner. As is to be appreciated from FIG. 2, the first fixing means 40 has a guide 41 into which the second fixing means 42 is able to be inserted in an insertion direction and presently backwards in a vehicle longitudinal direction. Thus, the fixing means 40, 42 interact positively whereby the high-visibility vest device 26 is able to be fixed or is fixed positively to the side door 10.

Presently, the fixing means 42 has an at least T-shaped cross-section. In other words, the fixing means 42 is formed as a T-piece and can engage behind the walls of the interior door paneling part 12 that limit the guide in the vehicle transverse direction, and thus interact positively with the fixing means 40.

The fixing means 40, 42 can be particularly simply and ergonomically moved relative to one another via the handle 36 and thus can be brought into and out of operative connection with one another. The vehicle passenger can feel the high-visibility vest device via the handle 36, even in the case of poor lighting conditions. So that the vehicle passenger can recognize the high-visibility vest device 26 even in poor lighting conditions, the handle 36 is provided, for example, with a signaling element. The signaling element can be a color, in particular a fluorescent color, or at least one electrical light source.

As can be seen in FIG. 2, the guide of the fixing means 40 tapers in the insertion direction. Thus, the fixing means 42 can first be pre-positioned in a front region of the guide in the vehicle longitudinal direction and subsequently can be displaced backwards in the insertion direction. In that the guide tapers backwards, the high-visibility vest device 26 is brought into a predeterminable and defined storage position, by interaction of the fixing means 40, 42.

This arrangement of the high-visibility vest device 26 on the side door 10 is particularly advantageous as the high visibility device 26 is particularly ergonomically accessible from the passenger space for a vehicle passenger sitting on the side of the side door 10. For this purpose, the vehicle passenger reaches across with, for example, his arm that is further from the side door 10, i.e. with the arm which is arranged on a side of the body facing away from the side door 10, and can reach the high-visibility vest device 26 particularly ergonomically via the handle 36.

Furthermore, the fixing means 40, 42 enable a hanging fixing of the high-visibility vest device 26 on the interior door paneling part 12 in the vehicle vertical direction underneath the arm rest 14 such that the base 20 of the storage compartment 16 is partially covered by the high-visibility vest device 26, upwards in the vehicle vertical direction, which, however, is not supported on the base 20. Rather, the high-visibility vest device 26 is at a distance from the base 20 upwards in the vehicle vertical direction, such that objects in the storage compartment 16 can be arranged underneath the high-visibility vest device 26. This means that the high-visibility vest device 26 does not impair storage options in the storage compartment 16.

In the state fixed to the side door 10, the high-visibility vest device 26 is, for the most part, covered by the side wall 22, inwards in the vehicle transverse direction. The handle 36, however, projects over the side wall 22, forwards in the vehicle longitudinal direction, such that the vehicle passenger can grip the handle 36 comfortably and ergonomically.

Figure 3:
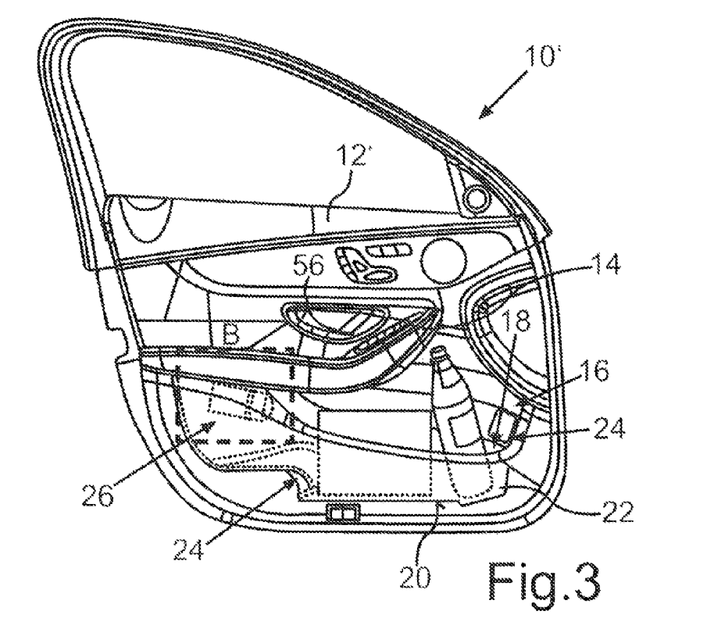
Figure 4:
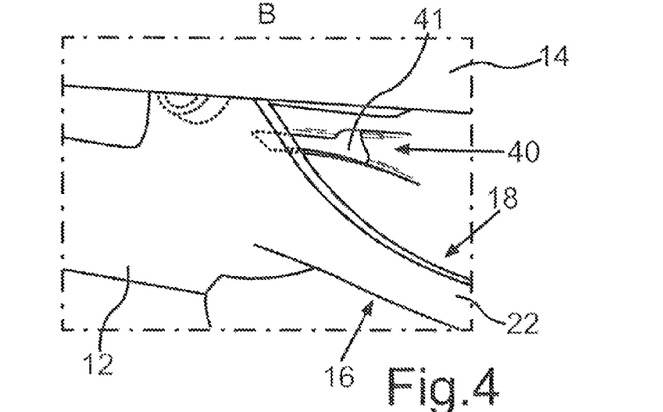
FIG. 4 in sections, a schematic and enlarged perspective view of the front side door.

FIGS. 3 and 4 show a front side door 10' of the passenger motor vehicle, which comprises an interior door paneling part 12'. A device to arrange a high-visibility vest device 26 on the side door 10 is also allocated to the side door 10'. The side door 10' having the interior door paneling part 12' only differs very slightly from the side door 10 having the interior door paneling part 12. These differences are, in particular, in the optical design. With regard to the function, and in particular with regard to the support of the high-visibility vest device 26 on the side door 10', they are substantially the same, such that what is depicted relative to the side door 10 having the interior door paneling part 12 can readily be transferred to the side door 10' having the inner door paneling part 12'.

Figure 5:
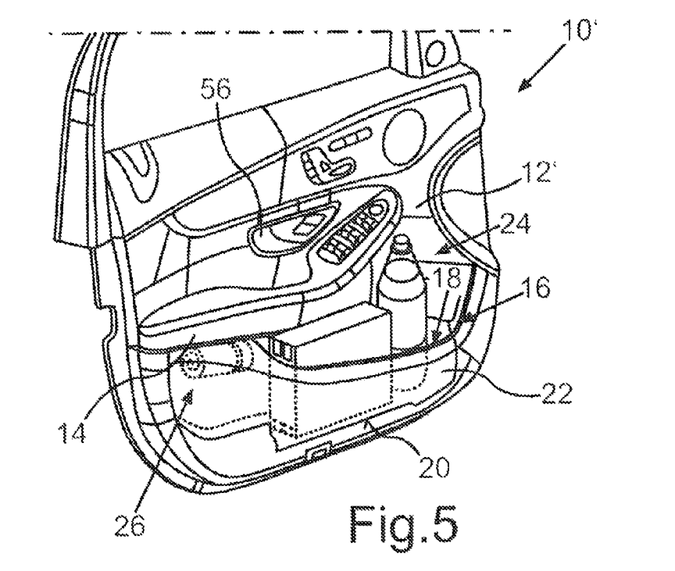
FIG. 5 in sections, a schematic perspective view of the front side door.
Figure 6:
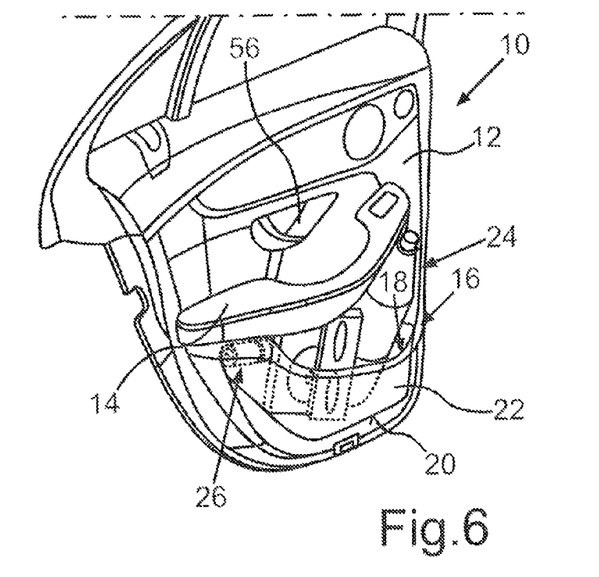
FIG. 6 in sections, a schematic perspective view of the rear side door.

FIG. 4 shows a region of the side door 10' referred to with B in an enlarged depiction, wherein the fixing means 40 is able to be recognized. The fixing means 40 has—as depicted previously—the guide 41, which has a cross-section which tapers backwards in the vehicle longitudinal direction and thus in the insertion direction. The side doors 10, 10' are again depicted in a perspective view in FIGS. 5 and 6.

The removal and fixing of the high-visibility vest device 26 from or to the side door 10' therein occurs at least substantially in the same manner as for the side door 10, such that a standardized, positive and defined connection is created. Thus, the high-visibility vest devices 26 can be located simply both on the side door 10 and on the side door 10' in at least substantially the same manner, can be gripped ergonomically and released from the side door 10, 10' as well as fixed again to the side door 10, 10'.

Figure 10:
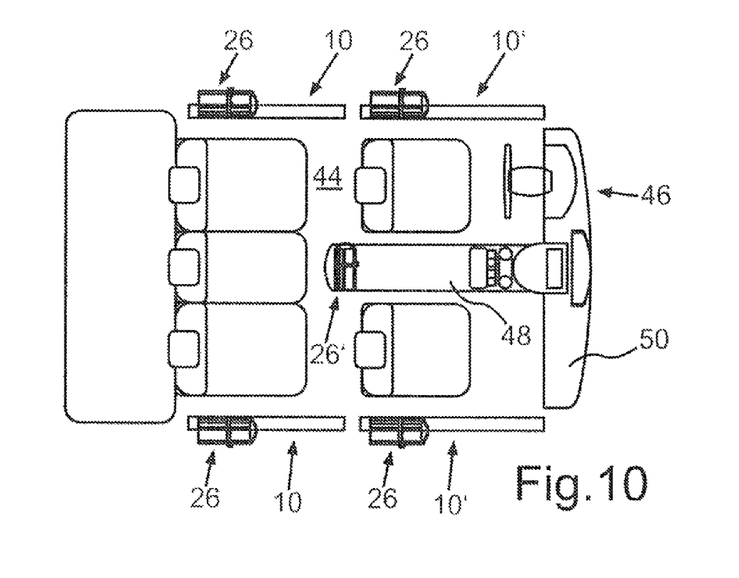
FIG. 10 a schematic depiction of a passenger space of the passenger motor vehicle, and FIG. 11 a schematic depiction of a display held on an instrument panel of the passenger motor vehicle, on which respective positions of the high-visibility vest device are displayed relative to the passenger motor vehicle on fulfillment of at least one predeterminable criterion.

FIG. 10 shows the passenger space referred to with 44 of the passenger motor vehicle referred to with 46. As is able to be recognized by means of FIG. 10, respective high-visibility vest devices 26 are fixed to both rear side doors 10 in the depicted manner. Respective high-visibility vest devices 26 are also fixed to the two front side doors 10' in the depicted manner.

In FIG. 10, a center console 48 is also illustrated, on which a further high-visibility vest device 26' having a high-visibility vest is fixed. Thus, in the passenger space 44, which is designed for five vehicle passengers, five high-visibility vest devices 26, 26' are provided, which are accessible from the passenger space 44. Thus, all vehicle passengers can put on a high-visibility vest before they leave the passenger space 44.

Figure 11:
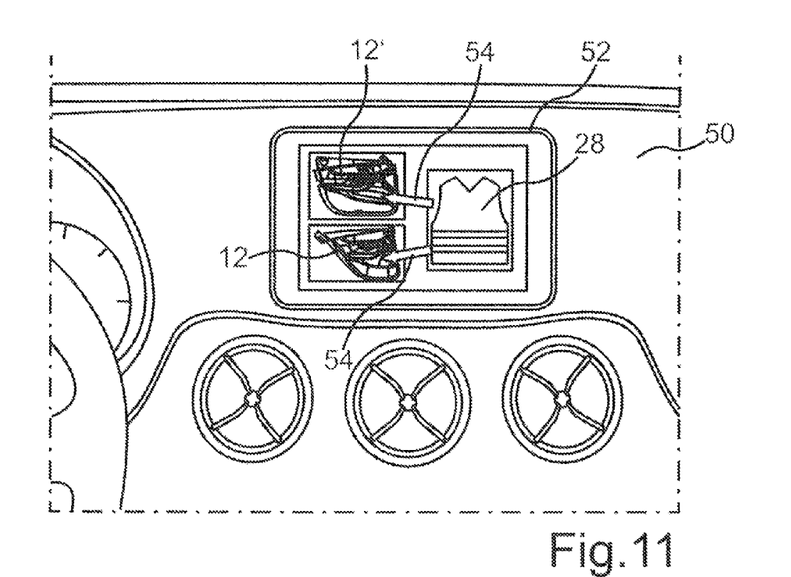

FIG. 11 shows in sections an instrument panel 50 of the passenger motor vehicle 46, on which a display 52 is held in the passenger space 44. A control device of the passenger motor vehicle 46 is allocated to the display 52. The control device is therein designed to display a respective position of at least one of the high-visibility vest devices 26, 26' relative to the passenger motor vehicle 46 on fulfillment of at least one predeterminable criterion. In other words, a method to operate a passenger motor vehicle 46 is provided in which the position of the high-visibility vest device 26 or 26' relative to the passenger motor vehicle 46 is depicted on the display 52 on fulfillment of at least one criterion. Thus, the vehicle passengers can be supplied with a warning message, which instructs the vehicle passengers to put on the high-visibility vests 28 before leaving the passenger space 44.

Presently, the warning message comprises a schematic depiction of the high-visibility vest 28 on the display 52 as well as schematic depictions of the interior door paneling parts 12, 12', wherein the respective positions of the high-visibility vest devices 26 is illustrated on the respective interior door paneling parts 12, 12' by means of the respective arrows 54.

The criterion, on fulfillment of which the warning message is displayed on the display 52, comprises, for example, the condition that the vehicle speed of the passenger motor vehicle 46 is lower than a predetermined threshold value. Preferably, the warning message is displayed if the criterion comprises the condition that the passenger motor vehicle 46 is at a standstill.

Alternatively or additionally, the criterion comprises an activation of a hazard light device of the passenger motor vehicle 46 and/or an operation of a side door inner handle 56 of the side door 10 or 10', via which the side door 10, 10' can be opened. In other words, the position of the high-visibility vest device 26 or 26' relative the passenger motor vehicle 46 is displayed on the display 52 if the passenger motor vehicle 46 is at a standstill and/or the hazard light device is activated and/or at least one side door inner handle 56 is operated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A side door of a motor vehicle, the side door comprising:
   an interior door paneling part having
      a storage compartment;
      a device to arrange a high-visibility vest device, which comprises a receiving element to receive at least one high-visibility vest at least in sections; and
   at least one first fixing means to which the high-visibility vest device is fixed by interaction of the first fixing means with at least one second fixing means provided on the receiving element.

2. The side door of claim 1, wherein the high-visibility vest device is positively fixed to the side door by the first and second fixing means interacting with one another.

3. The side door of claim 1, wherein one of the first and second fixing means has a guide into which the other of the first and second fixing means is insertable in an insertion direction.

4. The side door of claim 3, wherein the guide tapers in the insertion direction.

5. The side door of claim 1, wherein at least one handle is arranged on the receiving element, by means of which the first fixing means is moveable relative to the second fixing means into and out of operative connection with the second fixing means.

6. The side door of claim 1, wherein the high-visibility vest is held in a rolled-up manner by the receiving element.

7. The side door of claim 1, wherein the high-visibility vest device is fixable on an arm rest of the interior door paneling part of the side door.

8. The side door of claim 1, wherein a base of the storage compartment limiting a storage space of a storage compartment of the side door, downwards in a vertical direction of the vehicle, is covered at least partially by the high-visibility vest device arranged at a distance from the base, upwards in the vehicle vertical direction, in the state in which the high-visibility vest device is fixed to the side door.

9. The side door of claim 8, wherein the high-visibility vest device is covered at least partially inwardly in a transverse direction of the vehicle by a side wall of the storage compartment.

10. A device on a side door of a motor vehicle, the device comprising:
    a receiving element configured to contain at least one high-visibility vest at least in sections;
    at least one handle arranged on the receiving element, by means of which the high-visibility vest device is moveable relative to at least one door-side fixing means, into and out of operative connection with the door-side fixing means, to fix the high-visibility vest device to the side door.

11. A side door of a motor vehicle, the side door comprising:
    an interior door paneling part having
       a storage compartment;
       a device to arrange a high-visibility vest device, which comprises a receiving element to receive at least one high-visibility vest at least in sections; and
    first fixing element to which the high-visibility vest device is fixed by interaction of the first fixing element with a second fixing element provided on the receiving element.

12. The side door of claim 11, wherein the high-visibility vest device is positively fixed to the side door by the first and second fixing elements interacting with one another.

13. The side door of claim 11, wherein one of the first and second fixing elements has a guide into which the other of the first and second fixing elements is insertable in an insertion direction.

14. The side door of claim 13, wherein the guide tapers in the insertion direction.

15. The side door of claim 11, wherein at least one handle is arranged on the receiving element, by means of which the first fixing element is moveable relative to the second fixing element into and out of operative connection with the second fixing element.

16. The side door of claim 11, wherein the high-visibility vest is held in a rolled-up manner by the receiving element.

17. The side door of claim 11, wherein the high-visibility vest device is fixable on an arm rest of the interior door paneling part of the side door.

18. The side door of claim 11, wherein a base of the storage compartment limiting a storage space of a storage compartment of the side door, downwards in a vertical direction of the vehicle, is covered at least partially by the high-visibility vest device arranged at a distance from the base, upwards in the vehicle vertical direction, in the state in which the high-visibility vest device is fixed to the side door.

19. The side door of claim 18, wherein the high-visibility vest device is covered at least partially inwardly in a transverse direction of the vehicle by a side wall of the storage compartment.

* * * * *